(12) United States Patent
Hwang et al.

(10) Patent No.: US 7,464,239 B2
(45) Date of Patent: Dec. 9, 2008

(54) SYSTEM AND METHOD FOR REMOTE MIRROR DATA BACKUP OVER A NETWORK

(75) Inventors: Wen-Shyang Hwang, Kao-Hsiung Hsien (TW); Sheng-Hsiung Lin, Kao-Hsiung Hsien (TW); Meng-Yu Lee, Tai-Nan Hsien (TW); Shou-Jen Wey, Tai-Nan (TW)

(73) Assignee: Industrial Technology Research Institute, Hsinchu (TW)

( * ) Notice: Subject to any disclaimer, the term of this patent is extended or adjusted under 35 U.S.C. 154(b) by 261 days.

(21) Appl. No.: 11/461,773

(22) Filed: Aug. 2, 2006

(65) Prior Publication Data

US 2007/0239952 A1 Oct. 11, 2007

(30) Foreign Application Priority Data

Apr. 10, 2006 (TW) .............................. 95112655 A

(51) Int. Cl.
  G06F 12/00 (2006.01)
  G06F 15/16 (2006.01)

(52) U.S. Cl. ...................... 711/162; 711/170; 709/203; 709/208; 709/218; 709/219

(58) Field of Classification Search ................. 711/141, 711/161, 162, 170, 171, 172, 173
See application file for complete search history.

(56) References Cited

U.S. PATENT DOCUMENTS 5,615,329 A    3/1997  Kern et al. .................. 395/182
5,987,506 A *  11/1999 Carter et al. ................ 709/213
6,237,008 B1   5/2001  Beal et al. ................... 707/204
6,618,818 B1 * 9/2003  Wahl et al. ...................... 714/6
2003/0105829 A1 * 6/2003 Hayward .................... 709/214
2004/0236983 A1  11/2004 Burton et al. .................. 714/6
2005/0267928 A1 * 12/2005 Anderson et al. ........... 709/200
2007/0028065 A1 * 2/2007 Spear et al. ................. 711/162

OTHER PUBLICATIONS

CoStore: A Reliable and Highly Available Storage System Using Clusters Yong Chen, Lionel M. Ni, Chengzhong Xu, Mingyao Yang, Jay F. Kusler, Pei Zheng Proceedings of the 16th Annual International Symposium on High Performance Computing Systems and Applications (HPCS'02) 0-7695-1626-2/Feb. 2002 IEEE.

(Continued)

Primary Examiner—Jack A Lane

(57) ABSTRACT

Disclosed is a method and a system for remote mirror data backup over a network. The system comprises a local domain site and at least one remote domain site, wherein each site has one domain mirror agent and one storage server system thereon. Each storage server system includes one or more storage servers, and one of the domain mirror agents is pre-defined as the master mirror agent. With such a remote mirror system, the method performs the operations of virtual mirror device allocation, mirror operation, data consistency check, third mirror allocation, and recovery of local storage device. The present invention expands the conventional logical volume management (LVM) to a network environment, effectively improving the backup/recovery capability of remote mirroring.

20 Claims, 17 Drawing Sheets

OTHER PUBLICATIONS

CoStore: A Storage Cluster Architecture Using Network Attached Storage Devices Yong Chen, Lionel M. Ni, and Mingyao Yang Proceedings of the Ninth International Conference on Parallel and Distributed Systems (ICPADS'02) 1521-9097/Feb. 2002 IEEE.

CoStore: A Serverless Distributed File System Utilizing Disk Space on Workstation Clusters Yong Chen, Lionel M. Ni, Mingyao Yang, and Prasant Mohapatra 0-7803-7371-5/Feb. 2002 IEEE p. 393~p. 398.

YottaYotta High Performance NetStorage Data Localization and High Performance of Clustered File Systems Spanning Long Distances Yotta Yotta CFS White Paper, Oct. 2003.

* cited by examiner

SYSTEM AND METHOD FOR REMOTE MIRROR DATA BACKUP OVER A NETWORK

FIELD OF THE INVENTION

The present invention generally relates to data backup, and more particularly to a system and a method for remote mirror data backup over a network.

BACKGROUND OF THE INVENTION

The necessity and importance of computer data backup is well recognized in recent years as the continuous operation of most, if not all, organizations highly depends on the reliability and availability of digital data. Conventional local backup (i.e., backing up the data locally) is considered not adequate as it cannot guard against disasters (such as earthquake and flood) and theft, and the concept of remote backup, which preserves a backup copy of the data at a remote domain site, is proposed.

To conduct remote backup usually involves the duplication of large amount of data to a remote storage device over a network. This task requires significant network bandwidth, which is not practical in early days. However, as new last-mile technologies such as fiber-to-the-building (FTTB) and fiber-to-the-home (FTTH) are developed and deployed, the availability of bandwidth is no longer an issue and remote data backup has become an enthusiastic topic in the computer industry.

Remote data backup can be conducted in various ways. One popular approach is the so-called remote mirroring in which data output by an application is written to a local disk storage and a remote disk storage simultaneously.

FIG. 1 is a schematic diagram showing conventional disk volume management. As illustrated, a conventional disk storage contains one or more physical volumes such as /dev/hda and /dev/hdb, jointly combined into a volume group such as /dev/vg. Then, by a local mapping table, the volume group is partitioned into a number of logical volumes such as /dev/vg/lv1, /dev/vg/lv2, and /dev/vg/lv3. The minimum storage unit of a physical volume is called a physical extent (PE) ranging usually from 4 MB to 256 MB. Similarly, the minimum storage unit of a logical volume is called a logical extent (LE).

By mapping a remote physical volume as a local logical volume, a local mirroring mechanism can be employed to achieve remote mirroring. However, local mirroring is usually conducted over a high-speed, low-delay network such as a local area network (LAN) or a storage area network (SAN). In remote mirroring, in contrast, the extension of the mirroring mechanism over a wide area network (WAN), which involves significant delay from the geography, dispersion inevitably degrades the storage access and recovery performance, even though the remote backup copy of the data is safer from large-scale catastrophes.

U.S. Patent Publication No. 2004/0236983 discloses a data storage system capable of maintaining data consistency and cache coherency between remote mirror pair when the network communications therebetween is disrupted. As shown in FIG. 2, the data storage system 200 contains a first storage subsystem 212 and a second storage subsystem 214 at a remote domain site. The first and second storage subsystems 212 and 214 are coupled to one or more hosts 206 through controllers 222 and 224, respectively. The first and second storage subsystems 212 and 214 are also coupled to each other via a link 107. The controllers 222 and 224 allow the storage subsystems 212 and 214 to increase capacity and reliability by integrating large number of smaller storage modules. The link 107, on the other hand, allows an updated copy of the first storage subsystem 212's data to be backed up to the second storage subsystem 214.

U.S. Pat. No. 6,237,008 provides a pair-pair remote copy (PPRC) technique. As shown in FIG. 3, a local virtual storage volume B is "paired" with (i.e., mirrored to) a virtual storage volume C at a remote domain site. As shown in FIG. 3, a local domain site processor 310 issues a snapshot command 332 to store a "snapshot" copy of a directory of a virtual storage volume A into a directory of the virtual storage volume B, which is automatically mirrored to the paired virtual storage volume C by the remote mirroring processes. The technique can reduce the processing overhead in replicating data to remote storage volume. However, to recover from the remote mirrored data over a WAN, the recovery time would be too long due to the significant delay over the WAN.

U.S. Pat. No. 5,615,329 discloses a remote synchronous replication technique shown in FIG. 4A and a remote asynchronous replication technique shown in FIG. 4B. Under synchronous replication, there would be a higher level of consistency between the local and remote domain sites. However, the performance is significantly impaired if the replication is conducted over a WAN. In contrast, asynchronous replication achieves better performance at the cost of data consistency. The U.S. Pat. No. 5,615,329 patent also doesn't suggest how the recovery time can be further improved.

Another conventional technique is the CoStore architecture proposed by the University of Michigan, which achieves remote mirroring in a one-cluster-site-to-another-cluster-site manner. The technique is able to achieve better performance in remote mirroring by employing multiple local domain sites with concurrent transmission processes. However, the CoStore architecture is still based on file-level services and, when new storage space is added or when existing storage space is removed or adjusted, e.g., changing the column space of a redundant array of independent disks (RAID), in a cluster, tremendous effort of the system operator is required.

Additionally, Yotta proposed a NetStorage system in a paper "Data Localization and High Performance of Clustered File Systems Spanning Long Distances" published in 2003. The system relies on the aid of cache memory to achieve efficient clustered file system. However, to establish such a system, a dedicated storage network is required and the cost of ownership is too high for small and medium businesses.

Therefore, the major motivation behind the present invention is to strike a balance between increasing the performance of remote mirroring over a WAN and achieving storage resource sharing and transmission optimization.

SUMMARY OF THE INVENTION

The present invention provides a system and a method for remote mirror data backup, which extend the conventional volume management across a network, and effectively enhances the backup and recovery capability of remote mirroring.

According to the present invention, the remote mirror data backup system comprises a local domain site and at least a remote domain site, wherein every site of the system includes a domain mirror agent and a storage server system having one or more storage servers. Each domain mirror agent is responsible for the allocation and management of the storage resources of its site and the communications with other domain mirror agents. To ensure data consistency in this multi-agent environment, one of the domain mirror agents is pre-defined as a master mirror agent.

The method according to the present invention is implemented in the foregoing system. The method includes five major parts, i.e. the allocation of virtual mirror devices; the operation of the remote mirroring; the examination of data consistency; the allocation of a third mirror; and the recovery of the local domain site storage device.

The present invention provides the following advantages: (a) the benefit of conventional logical volume management (LVM), i.e., the ease of increasing and removing storage space, is preserved; (b) the fully utilization of a domain's storage resources; and (c) flexible data protection policies and reduced cost. The present invention is ideal for a cluster environment having multiple blade servers (e.g., in a research organization) or for an enterprise having a large number of computers.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

As mentioned earlier, the present invention provides a system and a method for remote mirror data backup, which extend the conventional logical volume management across a network. It provides a multi-agent mode to meet the needs of sharing more hosts in a multi-site environment.

Figure 1:
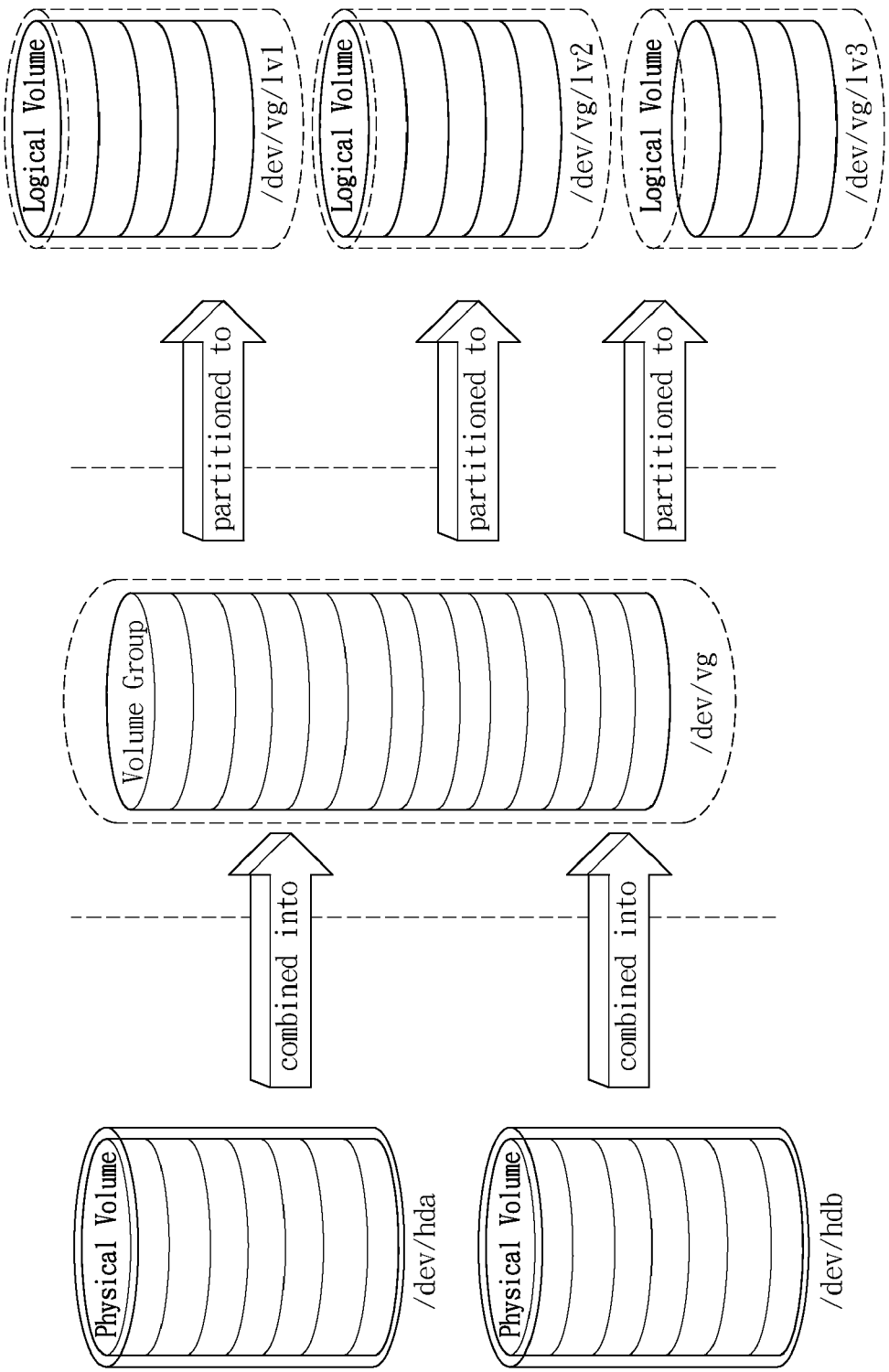
FIG. 1 is a schematic diagram showing conventional disk volume management.
Figure 2:
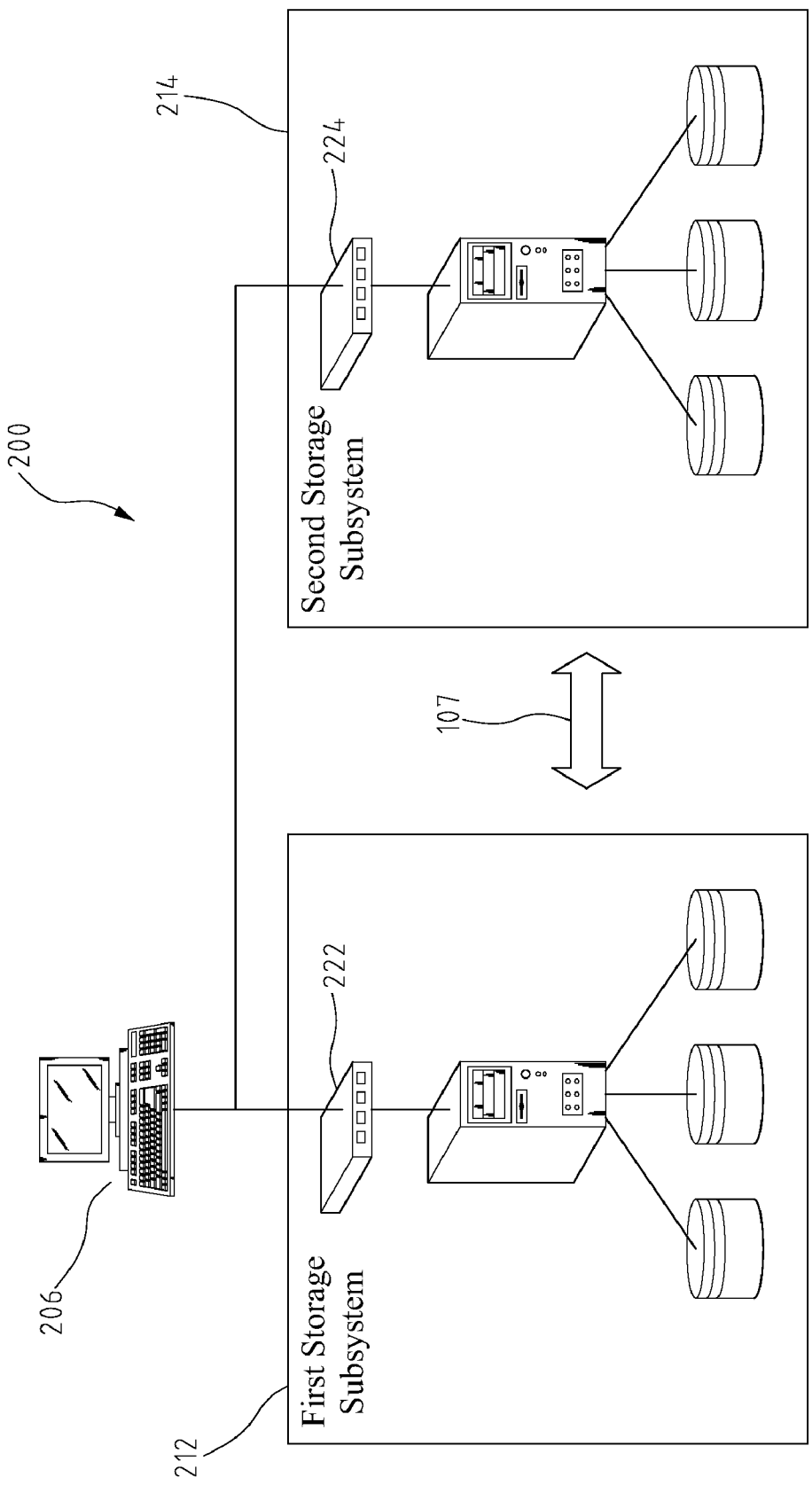
FIG. 2 is a schematic diagram showing a conventional data storage system capable of maintaining data consistency and cache coherency between a remote mirror pair.
Figure 3:
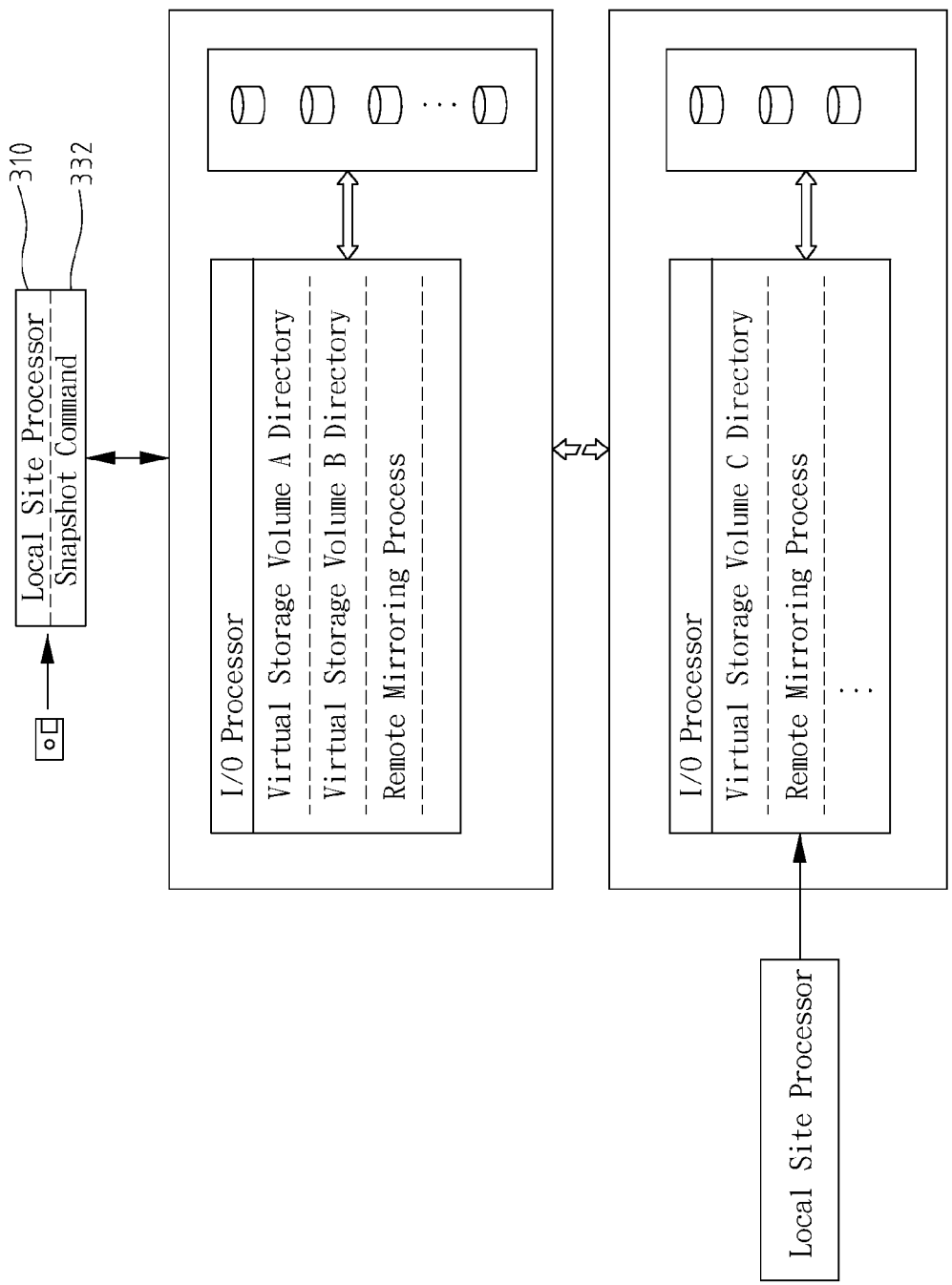
FIG. 3 is a schematic diagram showing a conventional pair-pair remote copy architecture.
Figure 4A:
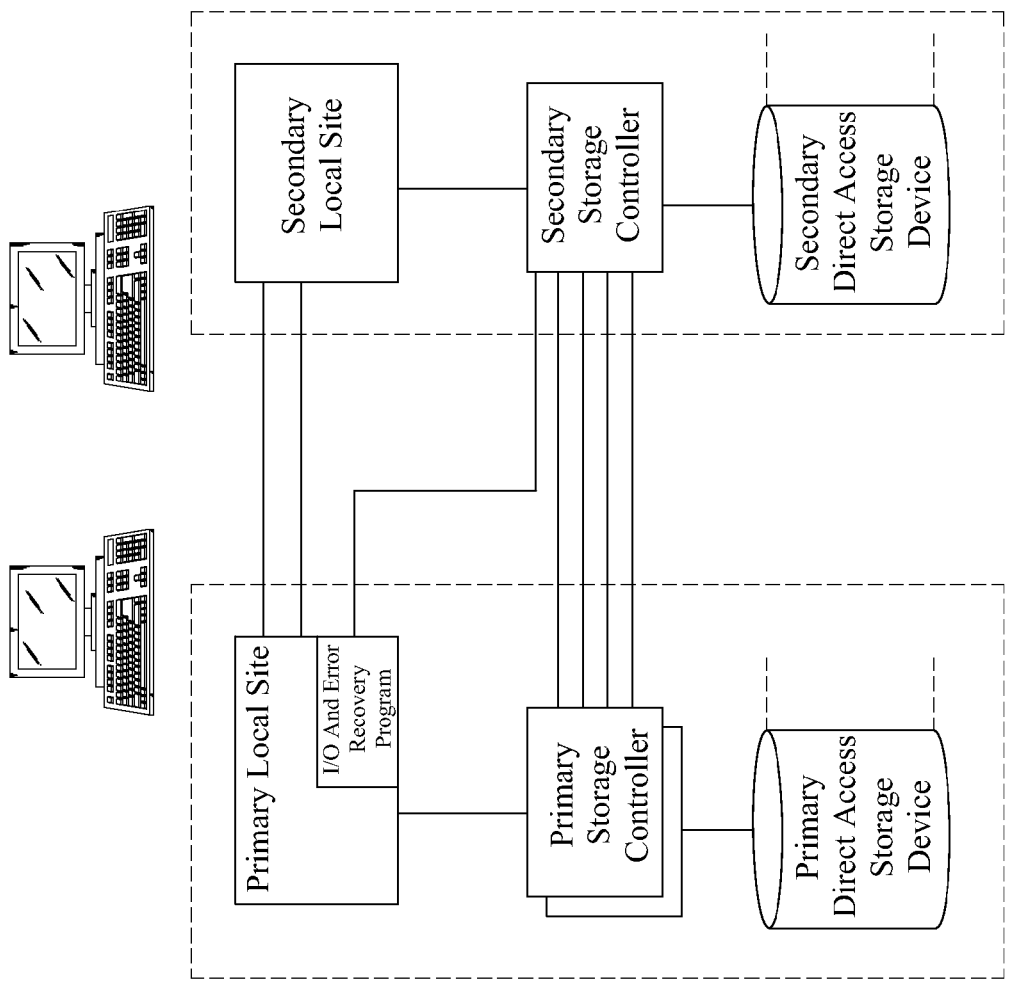
FIG. 4A is a schematic diagram showing a conventional synchronous remote copy architecture.
Figure 4B:
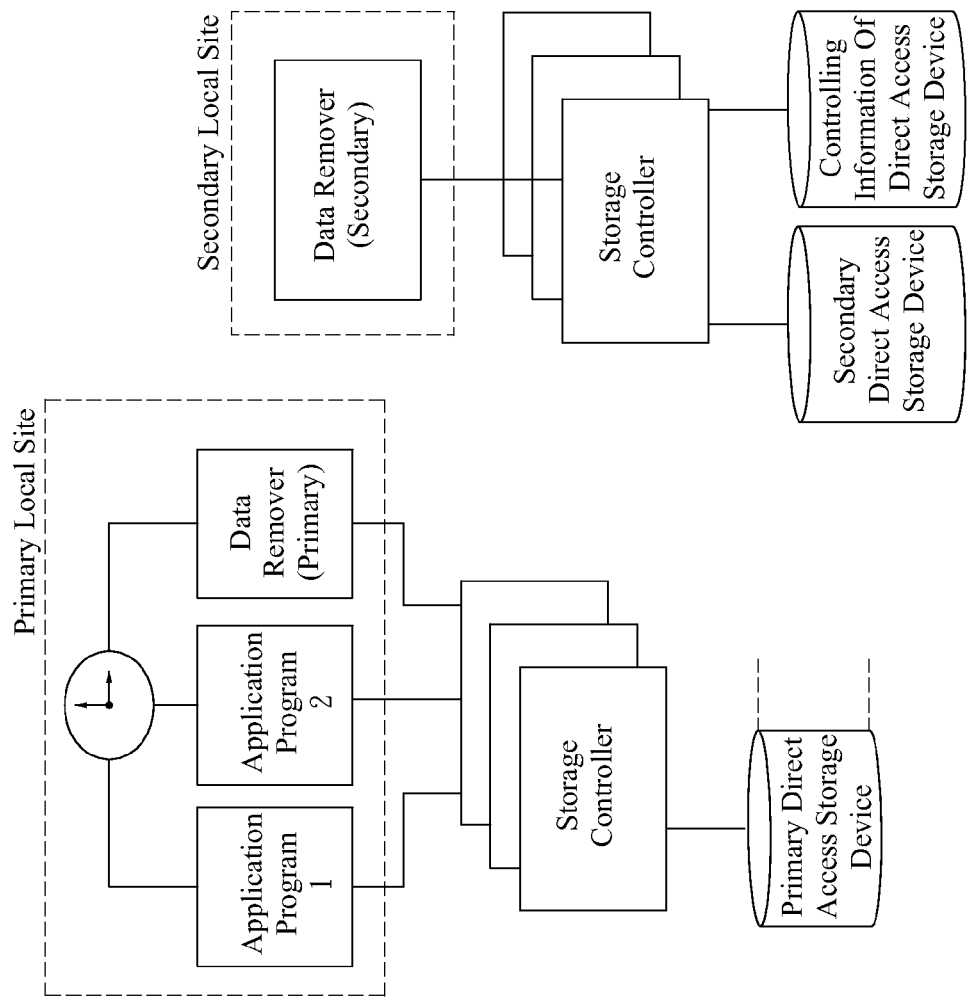
FIG. 4B is a schematic diagram showing a conventional asynchronous remote copy architecture.
Figure 5:
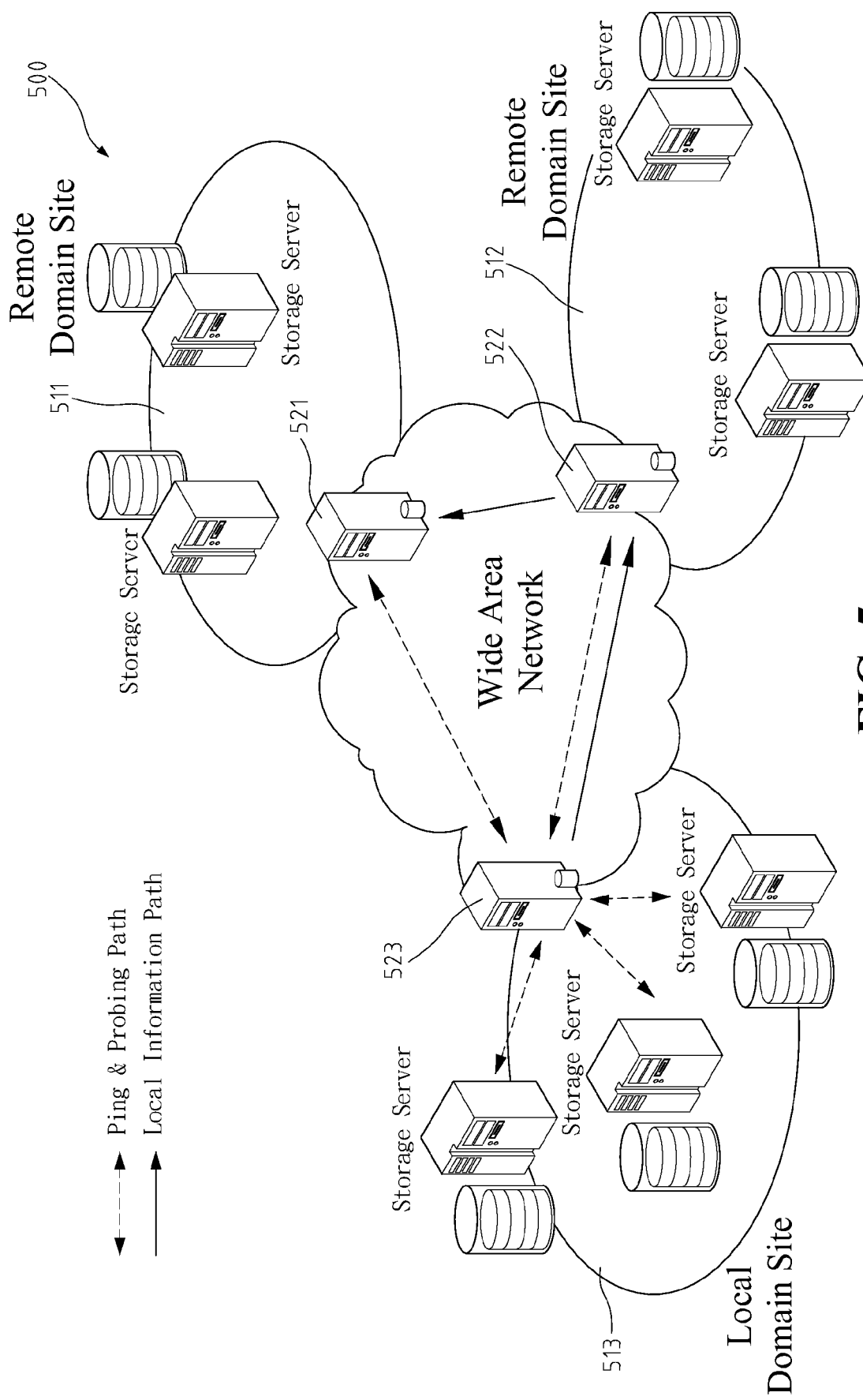
FIG. 5 is a schematic diagram showing the remote mirror data backup system according to an embodiment of the present invention.

FIG. 5 is a schematic diagram showing the remote mirror data backup system according to an embodiment of the present invention. As illustrated, the system 500 comprises a local domain site and one or more remote domain sites, each having a domain mirror agent and a storage server system with one or more storage servers. A domain mirror agent is responsible for the dynamic storage allocation for its domain site and for the communications with domain mirror agents of other domain sites. A domain mirror agent also periodically examines storage resource allocation of the local storage servers and the networking status between the local storage servers and other sites. The system 500 may further include an examination mechanism to ensure the data consistency between the mirrored data delivered by the local domain mirror agent and obtained by at least a remote domain site.

Without losing generality, three storage server systems 511, 512, 513, and three domain mirror agents 521, 522, 523 are depicted in FIG. 5 as an example. One of the domain mirror agents, 522 in the example, is predefined based on a weight value as a master mirror agent that collects information from other domain mirror agents and dispatches the collected information back to every domain mirror agent.

According to the present invention, a local storage server system includes a physical primary storage device and a virtual secondary storage device. The physical primary storage device includes the primary data to be mirrored while the virtual secondary storage device includes the mirrored data transmitted and distributed to at least one of the remote domain sites. On the other hand, a remote storage server system includes a host and one or more storages. The host is responsible for the communications with the local domain mirror agent and the storages are for storing the mirrored data distributed to the remote domain site.

The system 500 shown in FIG. 5 provides a multi-agent environment as a domain mirror agent is arranged in every site (i.e., 521-523). Each domain mirror agent records and monitors the status and the transmission speeds of the network links between itself and other domain mirror agents, and the availability of network communications between the local host and every other sites. With these pieces of information, the domain mirror agent is able to determine an optimal configuration regarding how data is mirrored to what remote domain sites. These pieces of information are also delivered to the master mirror agent, which in turn dispatches all collected information back to every domain mirror agent.

Logically, when a host issues a request for remote mirroring to the local domain mirror agent, the domain mirror agent determines a configuration for carrying out the remote mirroring request, and transmits the configuration to all involved hosts in the remote domain sites via their domain mirror agents. After the local domain mirror agent has confirmed that the configuration is appropriate, the configuration is then delivered to the master mirror agent that in turn notifies all domain mirror agents to update their records so that consistent status information is maintained among all domain mirror agents.

For the system 500 where the method of the present invention is applied, there are a local domain site and at least a remote domain site, and every site includes one or more storage server systems. Then, the method provided by the present invention first arranges a domain mirror agent at every site and lists them in a domain agent list. The method also predefines one of the domain mirror agents as the master mirror agent based on a weight value. When processing the remote mirroring request, the local domain mirror agent dynamically allocates a virtual mirror device for storing the mirrored data in the local domain site, establishes storage space mapping by locating appropriate remote domain sites for storing the mirrored data, and then conducts the mirror operation. The local domain mirror agent also adopts an examination mechanism to ensure the consistency between the data delivered by the local domain mirror agent and the data obtained by the remote domain sites.

In addition to the allocation of the virtual mirror device, conducting the mirror operation, and checking data consistency, the present method can further allocate a third mirror to enhance the security and availability of the mirrored data. Additionally, the present method may further include a mechanism for recovering local storage devices when they are crashed. The details about these five parts of the present method are described in the following.

Figure 6:
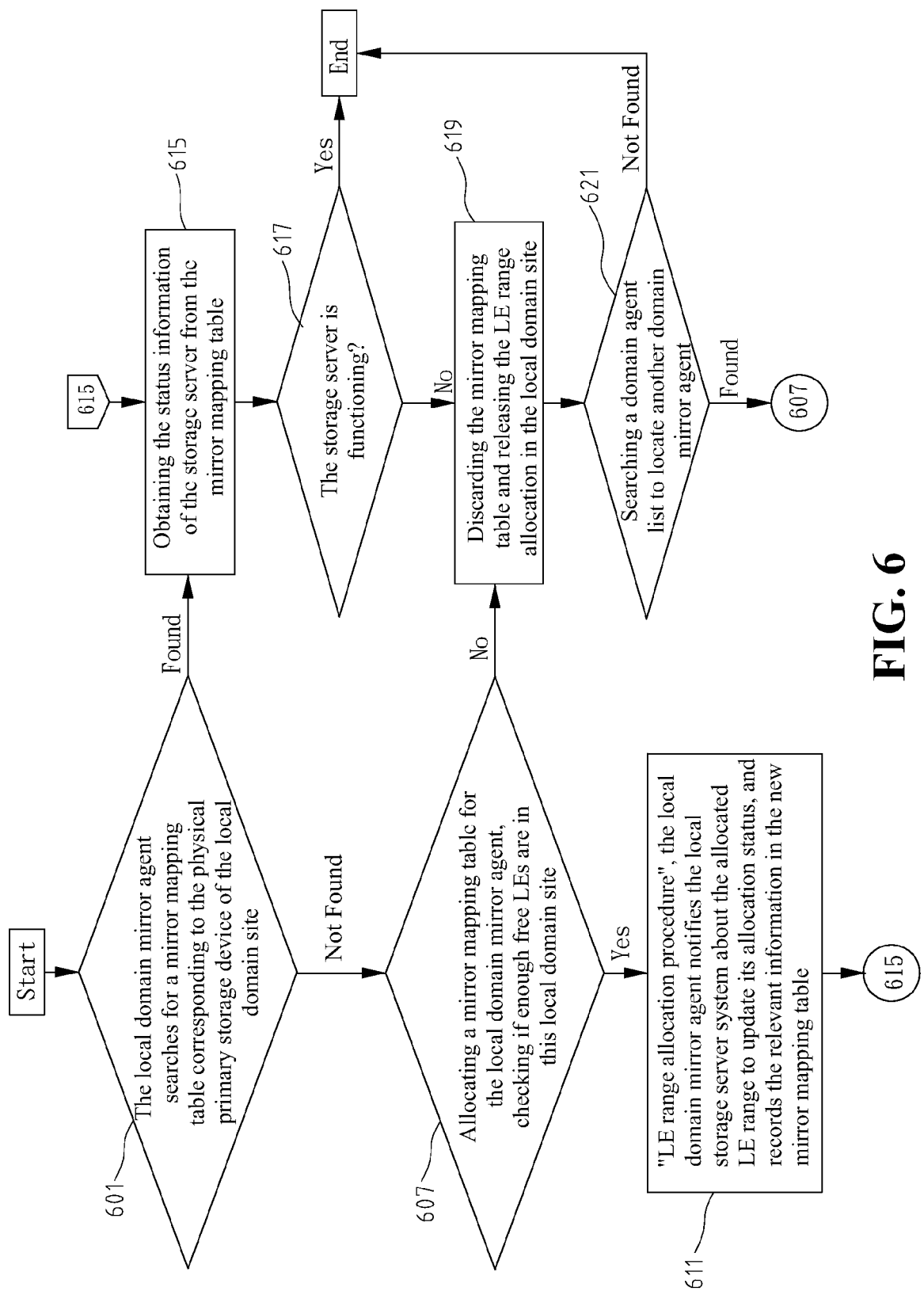
FIG. 6 is a flow chart illustrating the steps in allocating virtual mirror device according to the present invention.

FIG. 6 is a flow chart illustrating the steps in allocating virtual mirror device according to the present invention. As illustrated, in step 601, the local domain mirror agent searches for a mirror mapping table corresponding to the physical primary storage device of the local domain site so as to allocate a virtual secondary storage device. If such a mirror mapping table is found, the status information of the storage server from the mirror mapping table is obtained and whether the storage server is functioning normally is examined in steps 615 and 617 respectively. If the storage server is functioning normally, the process ends with the virtual secondary storage device being allocated.

If there is no mirror mapping table found in step 601, then a new mirror mapping table is allocated for the local domain mirror agent and the local domain mirror agent is instructed to check whether there is enough free LEs in this local domain site for allocation to the virtual secondary storage device, as shown in step 607. If there is enough free LEs, the local domain mirror agent conducts a LE range allocation procedure, notifies the local storage server system about the allocated LE range to update its allocation status, and records the relevant information in the new mirror mapping table, as shown in step 611. The process then continues to the step 615.

If there is not enough free LEs found in step 607, the mirror mapping table is discarded and the LE range allocation in the local domain site is released as well, as shown in step 619. Then, in step 621, a domain agent list is sought and if another domain mirror agent is located, the process goes directly to step 607; otherwise, the process is terminated as a virtual secondary device cannot be allocated.

Figure 7:
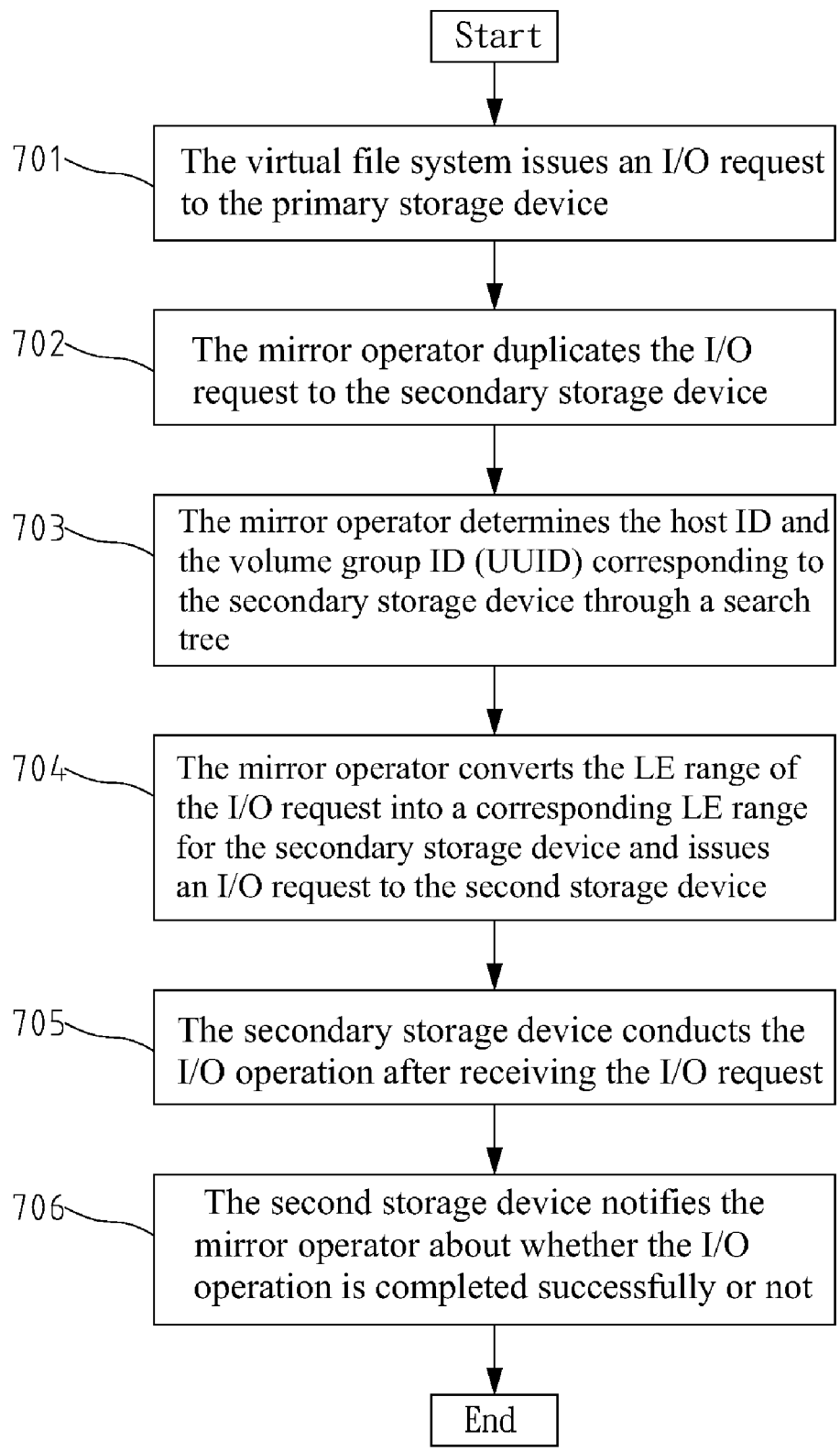
FIG. 7 is a flow chart illustrating the steps in conducting mirror operation according to the present invention.

When a virtual secondary storage device is allocated, the remote mirroring is conducted according to the flow diagram shown in FIG. 7. As illustrated, in step 701, a virtual file system (VFS) issues an I/O request to the primary storage device. A mirror operator duplicates the I/O request to the secondary storage device in step 702. Then, in step 703, the mirror operator determines the host ID and the volume group ID (UUID) corresponding to the secondary storage device through a search tree (e.g., an AVL B-Tree). The mirror operator then converts the LE range of the I/O request into a corresponding LE range for the secondary storage device and issues an I/O request to the secondary storage device in step 704. After receiving the I/O request, the secondary storage device conducts the I/O operation accordingly in step 705. Finally, the second storage device notifies the mirror operator about whether the I/O operation is completed successfully or not, as shown in step 706.

According to the present invention, all LE range resources on the secondary storage device are obtained from the hosts of remote domain sites. Therefore, in addition to the information about the corresponding relationship between the LE ranges of the local domain site and the remote domain sites, the present system and method should have the information about how to establish communications with the remote domain sites. These pieces of information are all stored in a data node, which include IP address of the host, network type, mirror operation mode, volume group ID (UUID), and the maximum and minimum range values of the LEs of each remote domain site. After all pieces of information are collected, a complete search tree such as the AVL B-tree is established by using the range information such as the minimum range value as index.

Figure 8:
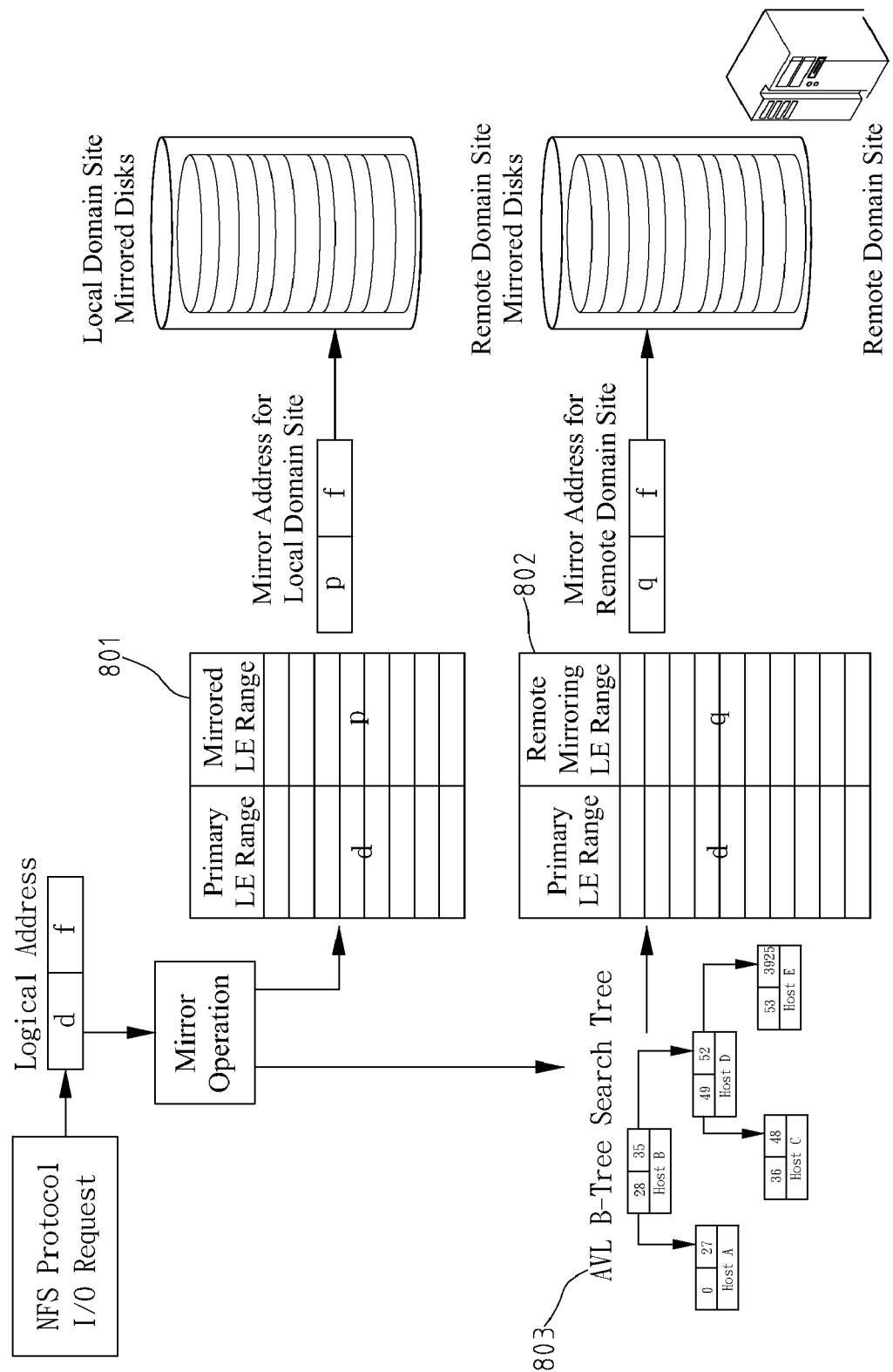
FIG. 8 is a schematic diagram illustrating the difference between a conventional local mirror operation and the remote mirror operation of the present invention.

After the search tree is established, the present invention is able to conduct the remote mirror operation. FIG. 8 is a schematic diagram illustrating the difference between a conventional local mirror operation and the remote mirror operation of the present invention. For the local mirror operation shown in the top half of FIG. 8, when a conventional volume group management system is executing the mirror operation, the mirror operator duplicates the messages from the I/O request and determines the mirrored LEs for this mirror operation from a pre-determined local mirror table 801.

For the remote mirror operation shown in the bottom half of the FIG. 8, the present invention also determines how the local LE ranges are mapped to which remote mirror LE ranges. However, before that, the present method first locates additional network transmission information regarding the mirrored LE ranges from the search tree (e.g., the AVL B-Tree 803). After obtaining the network transmission information, the present invention is thereby able to consult a remote mirror table 802 and to deliver the duplicated messages to the host of a remote domain site for execution there.

In the aforementioned CoStore mechanism, a client can directly mount RAID storage clusters by the network file system (NFS) protocol for read/write operations, or the client can mount RAID mirror clusters for read-only operations. In addition, the CoStore mechanism is able to ensure the data integrity by the parity servers of two cluster networks.

The network volume group management of the present invention is able to provide the same function to the clients as the storage server can obtain a space mapping table from the domain mirror agent to establish a virtual secondary storage device. Similarly, a client can also obtain relevant information from the space mapping table and establish a virtual secondary storage device on the local machine. The client therefore can access the data blocks either from the local domain site or from the remote domain sites.

Figure 9A:
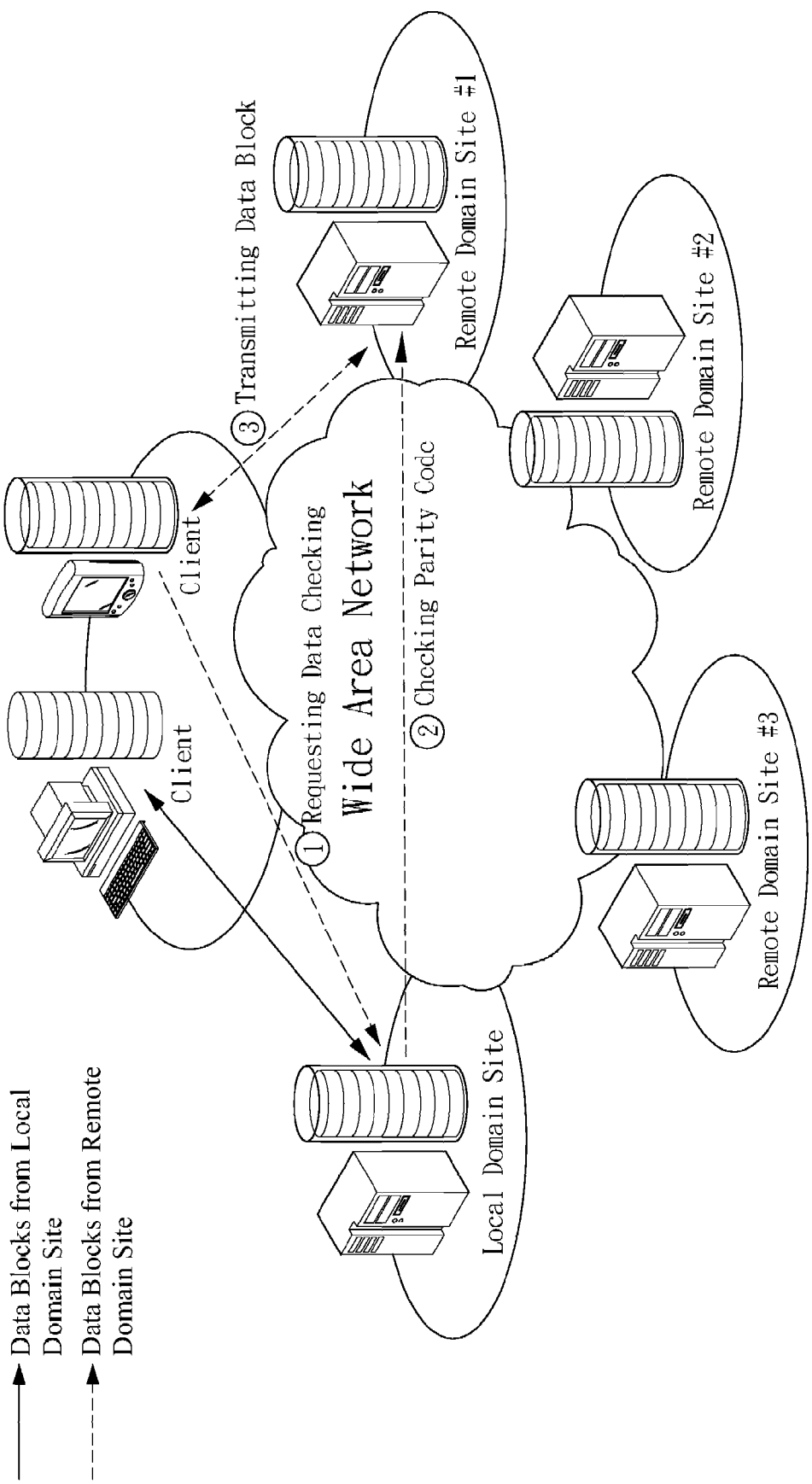
FIG. 9A is a schematic diagram showing how a client retrieves data blocks from local or remote domain sites.

As shown in FIG. 9A, when the data blocks are from a local storage server (denoted as solid arrowed line), the network volume group management of the present invention does not need to activate any data checking mechanism. When the data blocks are from a remote domain site (denoted as dashed arrowed line), the client has to issue a request for data checking first to the local domain site, which in turn asks the remote domain site to conduct parity code checking. When the local domain site has determined that the data blocks in the remote domain site are correct, the remote domain site is then permitted to transmit the required data blocks back to the local domain site. This approach is able to ensure the data blocks obtained from the remote domain site are consistent with those of the local domain site. However, this approach presents significant performance issue when conducted over a low-bandwidth, long-delay network.

Figure 9B:
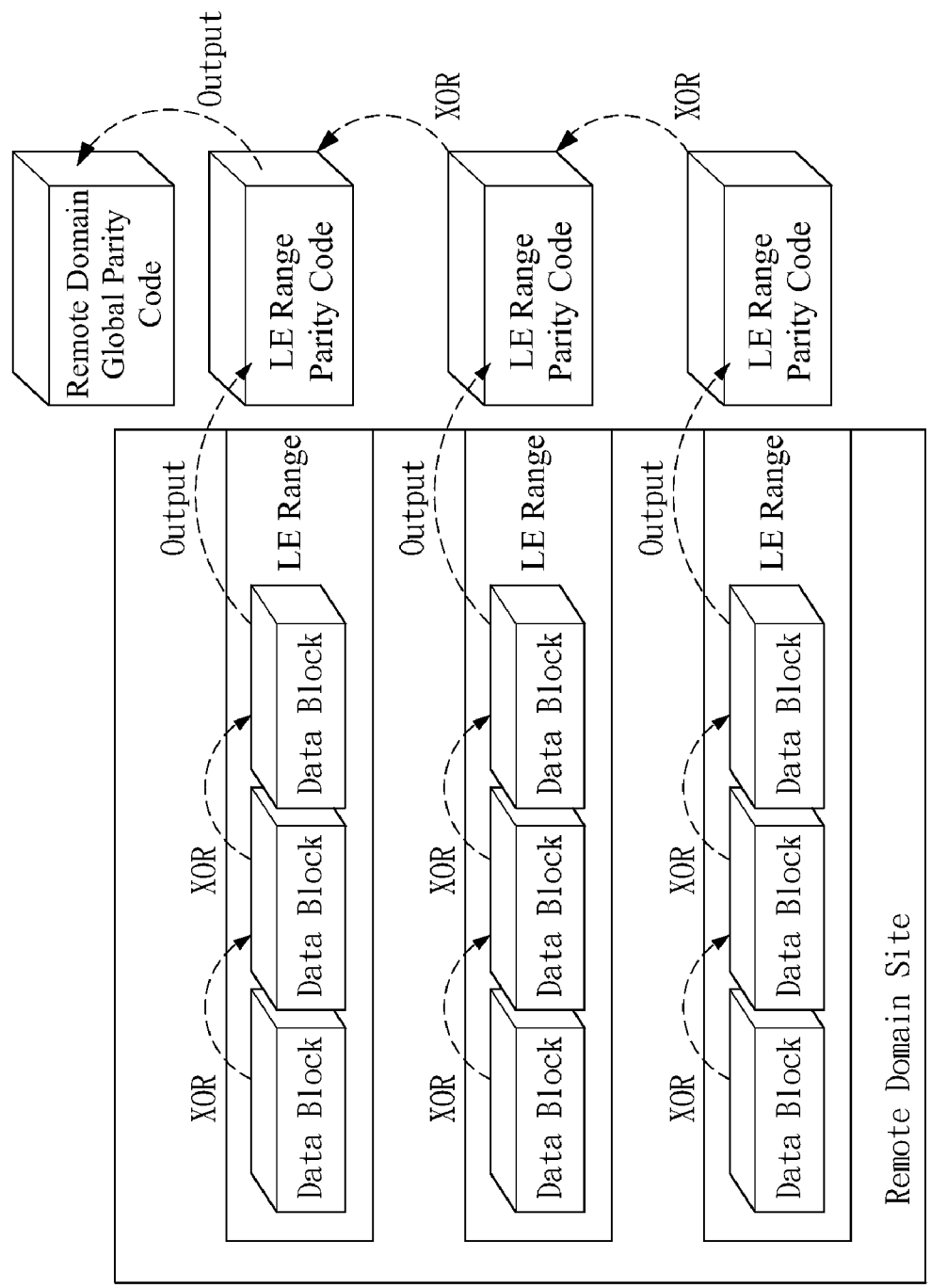
FIGS. 9B and 9C are schematic diagrams showing the two remote data checking mechanisms of the present invention.
Figure 9C:
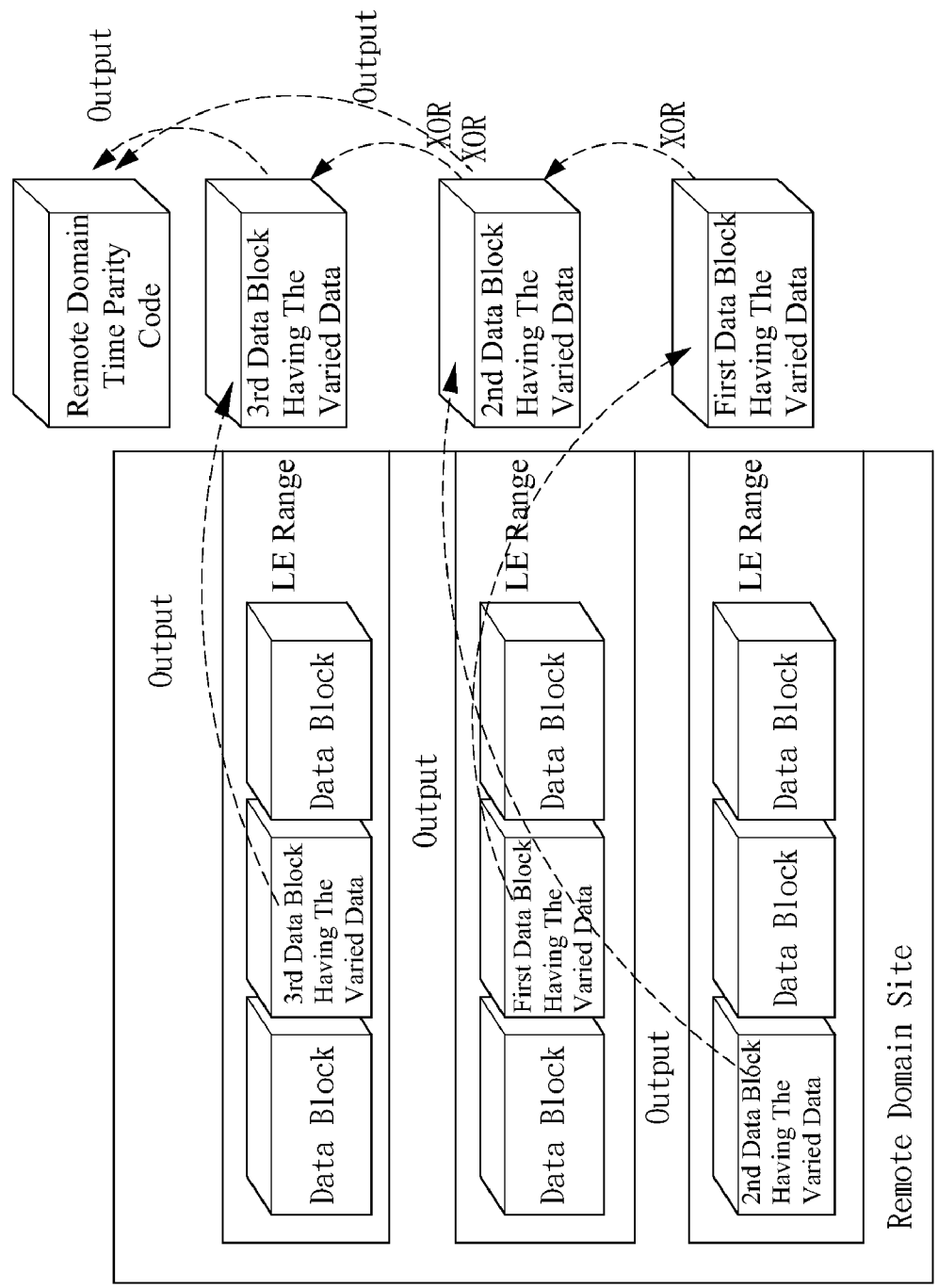

For the foregoing problem, the present invention provides two remote data checking mechanisms: hierarchical domain checking of FIG. 9B and data variation checking of FIG. 9C, which can all be applied to environments with low-bandwidth, long-delay networks.

As shown in FIG. 9B, the hierarchical domain checking calculates a remote domain global parity code for each remote domain site after the domain mirror agent has finished allocating the space mapping table. The remote domain global parity code is obtained by first XORing all data blocks within a LE range to obtain a LE parity code, then by XORing all LE parity codes of the remote domain site.

After obtaining all remote domain global parity codes of all remote domain sites, the hierarchical domain checking can first determines which remote domain site has a different remote domain global parity code from the parity code of the local domain site. After identifying one such remote domain site, the LE parity codes of the remote domain site are then examined one by one to determine which LE range of the remote domain site is corrupted and a subsequent data refresh operation can be conducted to fix the corrupted LE range. Yet the hierarchical domain checking consumes significant amount of CPU capacity in the very beginning when the data checking mechanism is activated.

The benefit of the data variation checking is most obvious when applied in a semi-synchronous mirroring mechanism. The data variation checking first initializes the remote domain time parity codes of all sites (e.g., to 0). Then, as shown in FIG. 9C when some data is varied, the data block having the varied data is outputted and XORed with the remote domain time parity code. When the number of the breach records of the semi-synchronous mirroring mechanism has rose above a threshold, the data variation checking first examines to see if the remote domain time parity codes of the local site and a remote domain site are identical. If yes, the remote and local domain sites are considered consistent, the remote domain time parity code of the remote domain site can be initialized again, and all breach records of the semi-synchronous mirroring mechanism can be purged. Otherwise, the remote and local domain sites are considered inconsistent and the mechanism would conduct further checking of all data or varied data. This mechanism can prevent semi-synchronous mirroring mechanism from unnecessary data checking resulted from the delay of the remote domain site's response.

Figure 10:
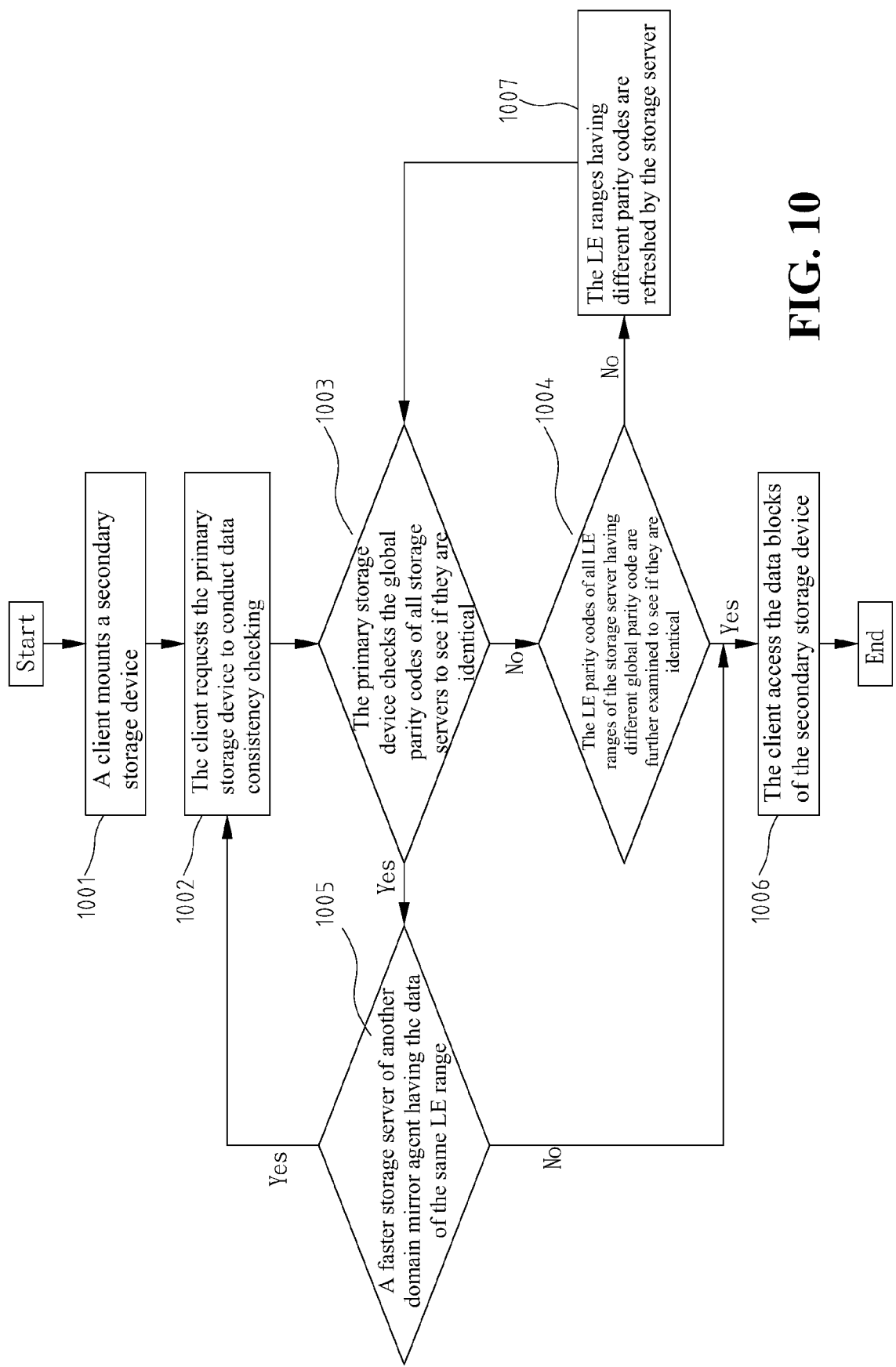
FIG. 10 is a flow chart illustrating the steps of hierarchical domain checking mechanism according to the present invention.

FIG. 10 is a flow chart illustrating the steps of hierarchical domain checking mechanism according to the present invention. As illustrated, a client mounts a secondary storage device in step 1001. Then, the client requests the primary storage device to conduct data consistency checking in step 1002. The primary storage device checks the global parity codes of all storage servers in step 1003 to see if they are identical. If not, the LE parity codes of all LE ranges of the storage server having different global parity code are further examined in step 1004; if yes, a faster storage server of another domain mirror agent having the data of the same LE range is determined in step 1005.

If there is a faster storage server found in step 1005, the process returns to step 1002; otherwise the client access the data blocks of the secondary storage device in step 1006.

After the step 1004, if LE parity codes are identical, the process continues to step 1006; otherwise the LE ranges having different parity codes are refreshed by the storage server in step 1007.

In various mirroring mechanisms, some provides a third mirror to further enhance the data security and availability. However, the third mirror due to its complexity is seldom implemented over a WAN. More common approach is to select a host from a number of third mirror candidates in the local or remote domain sites to play the role of the third mirror. However, the third mirror candidates are not ideal to both the local and remote domain sites.

Figure 11A:
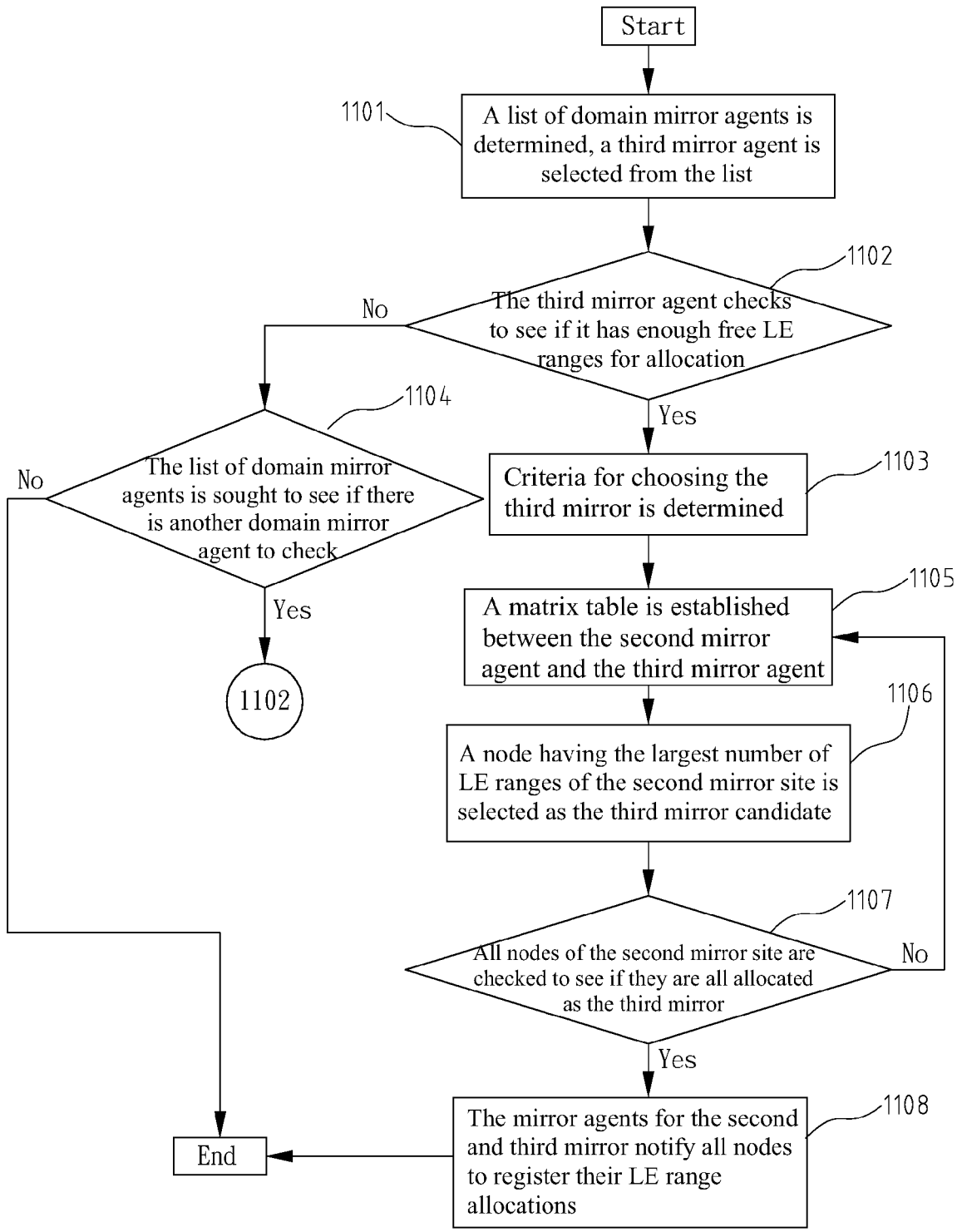
FIG. 11A is a flow chart illustrating the steps in determining the third mirror according to the present invention.

Accordingly, the present invention provides another approach to determine the third mirror that is optimal for both the local and remote domain sites in a multi-agent environment. FIG. 11A is a flow chart illustrating the steps in determining the third mirror according to the present invention while FIG. 11B is a schematic diagram of the environment where the process of FIG. 11A is implemented.

As illustrated in FIG. 11A, a list of domain mirror agents is determined first by finding those domain mirror agents that satisfy a certain transmission speed requirement from both the local domain site and a second mirror site and a certain storage capacity requirement in step 1101. One of the domain mirror agents is selected from the list in step 1101 (hereinafter, the third mirror agent). Then, the third mirror agent checks to see if it has enough free LE ranges for allocation in step 1102. If yes, criteria for choosing the third mirror is determined in step 1103. The criteria include, for example, fast backup, fast recovery, or a balance of the two. If there are not enough free LE ranges, the list of domain mirror agents is sought again to see if there is another domain mirror agent to check in step 1104. If yes, the process returns to the step 1102; otherwise the process is terminated.

When the process enters the step 1103, this implies there is an available third mirror candidate. After step 1103, a matrix table is established between the second mirror agent and the third mirror agent in step 1105. A node having the largest number of LE ranges of the second mirror site is selected as the third mirror candidate in step 1106. Then, in step 1107, all nodes of the second mirror site are checked to see if they are all allocated as the third mirror. If yes, the mirror agents for the second and third mirror notify all nodes to register their LE range allocations in step 1108. After the LE range allocations are registered, the third mirror is put to operation where, when data is written and forwarded to the nodes of the second mirror, the data is further forwarded by the second mirror to the third mirror.

Figure 11B:
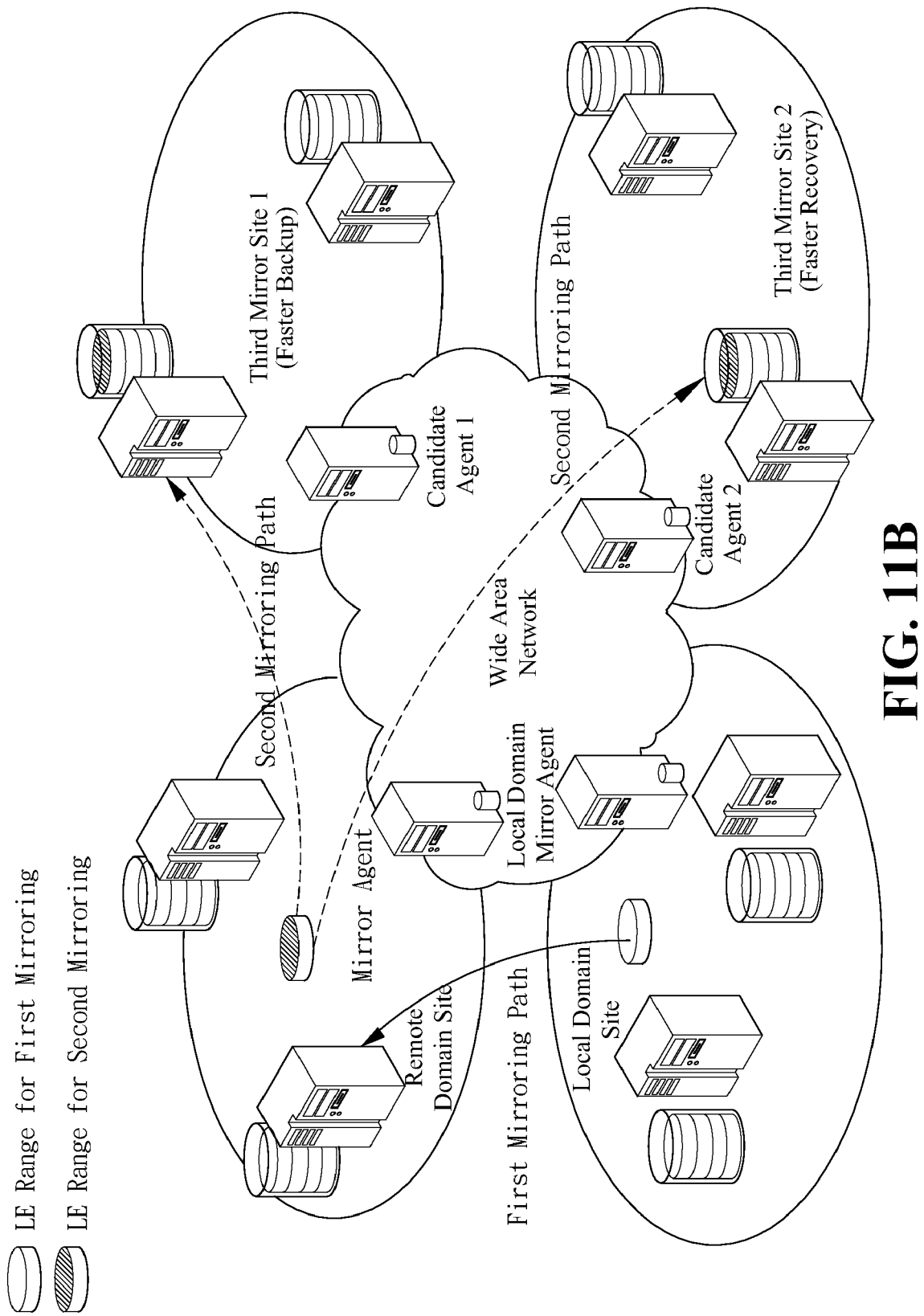
FIG. 11B is a schematic diagram of the environment where the process of FIG. 11A is implemented.

The algorithm in determining the third mirror is described using the environment shown in FIG. 11B. Assuming that a third remote mirror site is selected as the third mirror candidate for the remote mirror sites, then the local domain mirror agent will determine a weight value $W_{RT}$ between the third mirror site and the remote mirror sites, another weight value $W_{TL}$ between the local domain site and the third mirror site, the numbers of LE ranges $N_R$ that the local domain site assigns to each remote domain site (i.e., the number of LE ranges responsible for each remote domain site), and the numbers of LE ranges $N_T$ originally responsible by each remote domain site. These values are entered into the following equation to obtain a weight value $\varphi_{RT}$ for the third mirror site:

$$\varphi_{RT} = \sqrt{\left(\frac{N_R E_{size}}{W_{RT}}\right)^2 + \left(\frac{(N_R + N_T)E_{size}}{W_{TL}}\right)^2}$$

where $E_{size}$ is the amount of storage required by each LE.

When making selection from the third mirror candidates, two factors should be considered: the amount of time to forward the $N_R$ LE ranges to the host of the third mirror candidate; and the amount of time to rebuild the host of the local domain site when the hosts of both the local and second mirror sites are crashed. Please note that, at this point of time, the data transmitted by the host of the third mirror candidate should include the $N_T$ LE ranges maintained by itself and the $N_R$ LE ranges forwarded by the second mirror site. The weight value $\phi_{RT}$ is basically the slop of the route from the local domain site to the third mirror candidate via the second mirror site based on the Pythagorean Theorem.

Figure 11C:
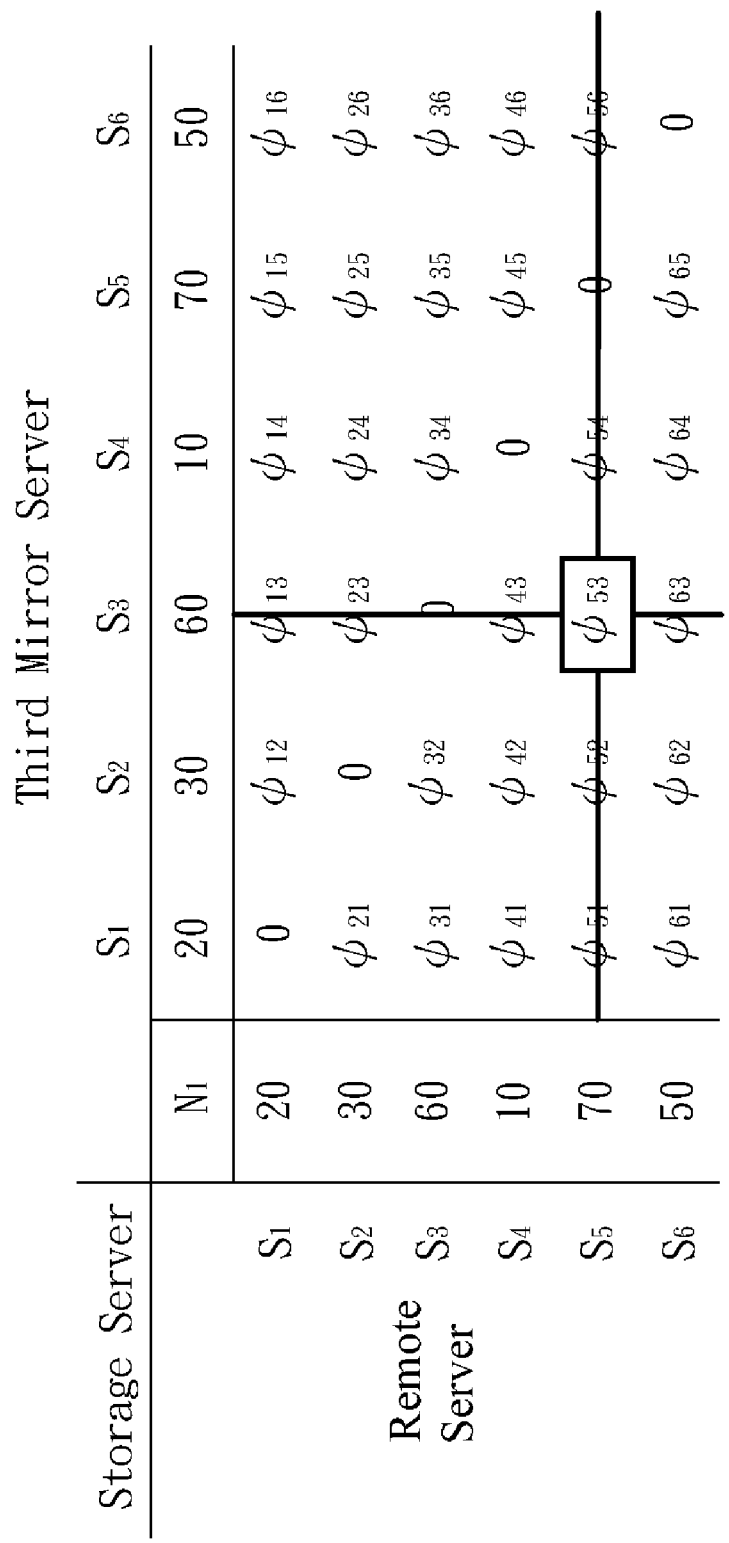
FIG. 11C is an exemplary matrix table obtained from the mirroring operation according to the present invention.

After the weight value $\phi_{RT}$ for each third mirror candidate is determined, a matrix table shown in FIG. 11C is obtained. Subsequently, the most appropriate candidate can be selected based on the $N_R$ value of the host of a candidate, and the smaller the weight value $\phi_{RT}$, the better the candidate. Please note that each third mirror candidate can be picked only once.

The mirroring operation has to follow the domain mirror agent's disposing of all storage servers, which, in addition to the selection of the best mirror candidate, includes the allocation rate of the number of LE ranges of each remote storage server. For the remote allocation of the remote storage servers, the domain mirror agent has to set up the best mapping table in accordance with the transmission capability of itself and each remote mirror agent. The present invention provides an algorithm for the space allocation of each remote storage server. The algorithm can determine a best virtual secondary storage device based on the resource available to the remote storage server. The algorithm is described as follows.

When the domain mirror agent receives a request message from a host of the local domain site, the domain mirror agent first looks for all available hosts in each remote domain site. Then, the domain mirror agent calculates a weight value $w_i$ for each candidate i based on the equation: $w_i = t_i \times h_i$, where $t_i$ is the average read/write throughput and $h_i$ is the proportion of network robust of the candidate i. Subsequently, the domain mirror agent calculates the required number of LE ranges $N_{total}$ with each LE takes up $E_{size}$ amount of storage for the master storage device of the local domain site. Then, the number of LE ranges $n_i$ handled by each candidate i is calculated using the following equation:

$$n_i = \frac{w_i}{\sum_{i=1}^{n} w_i} \times N_{total}.$$

Finally, the domain mirror agent requests each domain mirror agent of each remote domain site for the $n_i$ LE ranges. If confirmed by the remote domain mirror agents, the domain mirror agent can complete the mapping table and pass the mapping table to the host of the local domain site so that the host can establish a virtual secondary storage device for remote mirroring operation.

If the local host loses its data on the master storage device due to some disaster, the host can conduct recover operation by using the virtual secondary storage device. When the hosts of the remote domain sites receive recovery requests, the hosts sequentially send their responsible LE ranges back to the host of the local domain site for rebuilding the master storage device. Assuming that a single connection is established to each host of remote domain sites and the local domain site has a bandwidth $B_{local}$ to accommodate the maximum transmission speeds of all remote domain sites, the recovery time $R_{time}$ of the host of the local domain site can be expressed by the following equation:

$$R_{time} = \frac{N_{total} \times E_{size}}{\sum_{i=1}^{n} t_i},$$

If the bandwidth $B_{local}$ is not large enough to cover the transmission speed of all connections, the summation of the $t_i$'s in the above equation should be replaced by $B_{local}$. The steps of recovering the master storage device of the local domain site are shown in FIG. 12.

Figure 12:
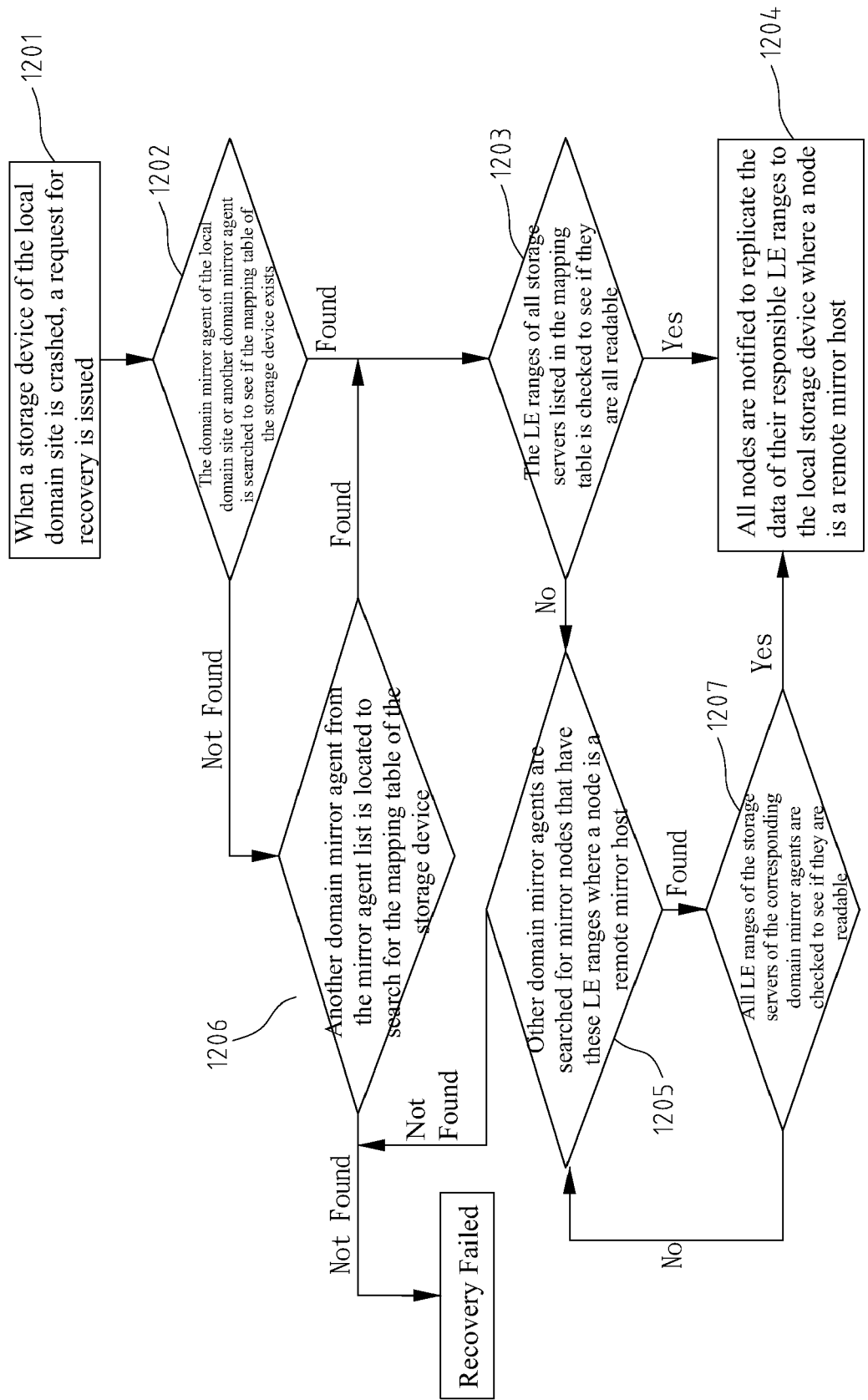
FIG. 12 is a flow chart illustrating the steps of recovering a storage device of the local domain site according to the present invention.

As illustrated in FIG. 12, when a storage device of the local domain site is crashed, a request for recovery is issued in step 1201. Then, the domain mirror agent of the local domain site or another domain mirror agent is searched to see if the mapping table of the storage device exists in step 1202. If the mapping table is found, the LE ranges of all listed storage servers are checked to see if they are all readable in step 1203. If they are all readable, then in step 1204, all nodes are notified to replicate the data of their responsible LE ranges to the local storage device where a node is a remote mirror host. If some LE ranges are not readable, other domain mirror agents are searched for mirror nodes that have these LE ranges in step 1205.

If there is no mirror nodes found in step 1205, the recover operation for the storage device has failed and the process ends. On the other hand, if there are mirror nodes found, all LE ranges of the storage servers of a corresponding domain mirror agents are checked to see if they are readable in step 1207. If yes, the process returns to the step 1204; otherwise, the process loops back to the step 1205.

If there is no mapping table found in step 1202, then, another domain mirror agent from the mirror agent list is located to search for the mapping table of the storage device in step 1206. If the mapping table is found, the process continues to the step 1203; otherwise, the recover operation for the storage device has failed and the process ends.

The performance of the present invention such as the R/W rate, CPU resource sharing, latency time for remote recovery, etc. has been extensively studied by multiple simulations in remote symmetric or asymmetric network transmission environment. Based on the simulation results, it has been discovered that the present invention outperforms the conventional approaches, in addition to its capability in providing many-site-to-many-site remote mirroring.

In an asymmetric network transmission environment, the present invention is easier to add or remove storage space than conventional RAID architecture. For ordinary data, the present invention can create new logical disk at any time as long as there is resource available and there is no need to rely on the costly RAID racks for data security. Sharing storage resource has also no need to rely on the NFS protocol. With a simple search tree (e.g., B-tree), the present invention can apply remote mirroring over various types of network environment.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for remote mirror data backup over a network, comprising:

a local domain site having one and only one domain mirror agent responsible for dynamic storage space allocation of a storage server system with one or more storage servers in said local domain site, and communication with other domain sites;

at least one remote domain site, each said remote domain site having one and only one domain mirror agent responsible for dynamic storage space allocation of a storage server system with one or more storage servers in each said remote domain site, and communication with other domain sites; and wherein one of said domain mirror agents of said local domain site and said at least one remote domain site is pre-defined as a master mirror agent based on a weight value, and said master mirror agent collects information from other said domain mirror agents and dispatches collected information to each said domain mirror agent.

2. The system according to claim 1, wherein said local domain site further includes a physical primary storage device and a virtual secondary storage device, said primary storage device includes primary data to be mirrored; and said secondary storage device includes mirrored data transmitted and distributed to said at least one remote domain site.

3. The system according to claim 1, wherein said system extends a logical volume management over said network by using a search tree to locate one of said at least one remote domain site for storing mirrored data with a minimum range value of logical extent ranges as index.

4. The system according to claim 1, wherein said storage server system of each said remote domain site further includes a host responsible for communications with said domain mirror agent of a same remote domain site and said one or more storage servers in said same remote domain site are for storing mirrored data distributed to said same remote domain site.

5. The system according to claim 1, wherein said system further includes an examination mechanism to ensure the consistency between mirrored data delivered by said domain mirror agent of said local domain site and mirrored data obtained by said at least one remote domain site.

6. A method of remote mirror data backup over a network having at least one local domain site and at least one remote domain site, each said domain site having a storage server system, said method comprising the steps of:

arranging a domain mirror agent in each said domain site, listing all said domain mirror agents in a domain agent list, and pre-defining a domain mirror agent as a master mirror agent;

dynamically allocating a virtual mirror device in said local domain site to store mirrored data after said domain mirror agent of said local domain site receives a remote mirroring request;

allocating a space mapping table to locate said at least one remote domain site for storing the mirrored data, and conducting a mirroring operation to duplicate the mirrored data from said virtual mirror device to said at least one remote domain site; and examining the consistency between the mirrored data received by said remote domain sites and the mirrored data transmitted by said domain mirror agent of said local domain site.

7. The method according to claim 6, further including a step of allocating a third mirror to increase the availability and security of the mirrored data.

8. The method according to claim 7, wherein said allocating said third mirror includes a step of selecting a third mirror candidate, said selecting said third mirror candidate includes:

obtaining a weight value $\phi_{RT}$ according to a function involving a weight value $W_{RT}$ between said third mirror candidate and said remote domain sites, a weight value $W_{TL}$ between said local domain site and said third mirror candidate, the numbers of logical extent (LE) ranges $N_R$ that said local domain site assigns to each said remote domain site, the numbers of LE ranges $N_T$ originally responsible by said third mirror candidate; and selecting said third mirror candidate having a smallest said weight value $\phi_{RT}$ with each said third mirror candidate being selected only once.

9. The method according to claim 7, wherein said allocating said third mirror includes the steps of:

(a1) selecting a domain mirror agent from a third mirror candidate domain agent list, which is determined by finding those domain mirror agents that are from both said local domain site and a second mirror site;

(b1) checking to see if the domain mirror agent has enough free logical extent (LE) ranges for allocation, if yes, determining the criteria for selecting said third mirror and continuing to step (d1), otherwise, continuing to step (c1);

(c1) searching said domain agent list for another third domain mirror agent, if yes, continuing to step (b1), otherwise terminating said allocating said third mirror;

(d1) establishing a matrix table between said domain mirror agent of said second mirror site and a third mirror agent of said third mirror, and selecting a node having a largest number of LE ranges of said second mirror site as said third mirror candidate wherein a node is a remote mirror host; and (e1) checking all nodes of said second mirror site to see if they are all allocated as said third mirror, if not, continuing to step (d1), otherwise notifying all nodes to register their LE range allocations and terminating the allocation of said third mirror.

10. The method according to claim 6, further including a step of recovering a storage device for said local domain site.

11. The method according to claim 10, wherein the recovery time of a storage device of said local domain site is determined by the number of logical extent (LE) ranges required by a host of said local domain site, the amount of storage of each LE, and the transmission speeds of connections to all remote domain sites.

12. The method according to claim 10, wherein the recovery of a storage device of said local domain site comprises the steps of:

(a11) specifying said domain mirror agent of said local domain site or another said domain mirror agent to search for a mapping table of said storage device, if found, continuing to step (b11), otherwise continuing to step (c11);

(b11) checking logical extent (LE) ranges of all storage servers listed in said mapping table to see if they are all readable, if yes, continuing to step (d11), otherwise continuing to step (e11);

(c11) specifying another said domain mirror agent from said mirror agent list to search for said mapping table of said storage device, if found, continuing to step (b11), otherwise terminating the recovery of said storage device;

(d11) notifying all nodes to replicate data of their responsible LE ranges to said storage device where a node is a remote mirror host;

(e11) for non-readable LE ranges, searching other domain mirror agents for nodes that have said non-readable LE ranges where a node is a remote mirror host, if not found, terminating the recovery of said storage device, otherwise, continuing to step (f11); and (f11) checking all LE ranges of all storage servers of said domain mirror agent to see if they are all readable, if yes, continuing to step (d11), otherwise, continuing to step (e11).

13. The method according to claim 6, wherein said master mirror agent collects information regarding the status and transmission speed of network links between each said domain mirror agent and dispatches the collected information back to each said domain mirror agent.

14. The method according to claim 6, wherein said method utilizes a hierarchical domain checking mechanism for the examination of consistency.

15. The method according to claim 14, wherein said hierarchical domain checking mechanism includes the steps of:
   XORing all data blocks within a logical extent (LE) range to obtain a LE parity code for each said domain site; and
   XORing all LE parity codes to a remote domain global parity code for each said remote domain site.

16. The method according to claim 6, wherein said method utilizes a data variation checking mechanism for the examination of consistency.

17. The method according to claim 16, wherein said data variation checking mechanism includes the steps of:
   initializing remote domain time parity codes of all said domain sites;
   wherein when some data is varied, a data block having the varied data of a domain site is outputted and XORed with the remote domain time parity code of said domain site; and
   wherein when examining data consistency, the remote domain time parity codes of said local domain site and said remote domain site are compared.

18. The method according to claim 6, wherein said dynamically allocating said virtual mirror device in said local domain site includes the steps of:
   (a) searching for a corresponding mirror mapping table of a physical primary storage device of said local domain site so as to allocate a virtual secondary storage device, if found, continuing to step (b), otherwise continuing to step (c);
   (b) obtaining the status information of storage servers listed in said mirror mapping table and continuing to step (d);
   (c) allocating a new mirror mapping table for said domain mirror agent of said local domain site, and checking whether there are enough free logical extent (LE) ranges in said local domain site for allocation to said virtual secondary storage device, if yes, continuing to step (e), otherwise continuing to step (f);
   (d) checking if a storage server listed in said mirror mapping table functions properly, if yes, successfully allocating said virtual mirror device and terminating the process of said dynamically allocating said virtual mirror device, otherwise continuing to step (g);
   (e) conducting a LE range allocation procedure by said domain mirror agent of said local domain site, notifying said storage server system about the allocated LE ranges to update its allocation status, recording the relevant information in said new mirror mapping table, and continuing to step (b);
   (f) searching said domain agent list for another said domain mirror agent, and continuing to step (c); and
   (g) discarding said mirror mapping table and the LE range allocation, and continuing to step (c).

19. The method according to claim 6, wherein said mirroring operation includes the steps of:
   issuing a first I/O request to a primary storage device of said local domain site;
   duplicating said first I/O request to a secondary storage device by a mirror operator;
   determining a host ID and a volume group ID (UUID) corresponding to said secondary storage device through a search tree;
   converting a logical extent (LE) range of said first I/O request into a corresponding LE range for said secondary storage device;
   issuing a second I/O request to said secondary storage device; and
   notifying said mirror operator about if a requested I/O operation via said first I/O request and said second I/O request is completed successfully.

20. The method according to claim 6, wherein said allocating a space mapping table includes a step of establishing a search tree, where logical extent (LE) range information is maintained and used as an index to a mirror mapping table for locating a remote domain site where the mirrored data is stored.

* * * * *